UNITED STATES PATENT OFFICE.

WILLIAM B. TUCKER, OF BALTIMORE, MARYLAND, ASSIGNOR TO FRISBY LLOYD, OF SAME PLACE.

IMPROVEMEMT IN THE MANUFACTURE OF ARTIFICIAL HYDRAULIC CEMENT.

Specification forming part of Letters Patent No. 138,770, dated May 13, 1873; application filed October 25, 1872.

*To all whom it may concern:*

Be it known that I, WILLIAM B. TUCKER, of the city of Baltimore, State of Maryland, have invented certain new and useful Improvements in Compounding and Manufacturing Artificial Hydraulic Cement; and do hereby declare the following to be a full and exact description thereof.

The object of my invention is to furnish a new, cheap, durable, and efficient article of hydraulic cement or mortar for various building purposes, such as cements and mortars are used for, as well as for making pipe, sewers, pavements, basins, urns, vases, statuary, monuments, burial-cases, tiles, picture-frames, slabs, letters, molding, concretes, coating for vessel-bottoms, and also for making artificial stone for general use.

In order to enable others skilled in the art to make and use my invention, I will now proceed to describe more fully its nature and the process of its manipulation and manufacture.

My invention consists in the use of Blue river, pit, or other clays that contain some or all of the following substances, viz., silica, alumina, oxide of iron or manganese or corundum combined with them, either naturally or chemically, in combination with any lime or limes, either in the carbonate or caustic state, which have absorbed or become saturated with hydrogen, sulphurous or sulphuric acid, or the alkaline matter from potash, soda, or soda-ash or wood ashes by the said lime or limes having been used in the manufacture or purification of illuminating-gas or in the manufacture of lyes for chemical or other purposes; said clays and limes, when combined, giving an analysis similar to natural hydraulic limestones, such as are used for manufacturing natural hydraulic cements.

To make my artificial hydraulic cement, which I designate "Keystone" cement, I take the Blue river, pit, or other clay containing silica, alumina, corundum, oxide of iron or manganese, or these substances in suitable proportions, in combination with clay, and, after thoroughly divesting it or them of moisture, I proceed, by the use of burr-mills or other suitable means, to grind them to a fine powder. I then take three parts of lime which has absorbed, by its use in purifying illuminating-gas, hydrogen, sulphurous or sulphuric acids, and one part of the lime containing alkaline matter absorbed in its use in making lyes for chemical or other purposes, and proceed to mix and dry them in a vessel suitable for such purposes, and, after being well mixed and dried, I then grind to a fine powder the limes thus prepared. I then take one part of the dry ground clay and two and one-half parts of the lime thus mixed and ground, and thorougly mix them in the dry state together; after which I put the mass into a pug or mortar mill, and, by the addition of one-third lime-water heated to a temperature of about 100° or 125° Fahrenheit, I mix said materials in a heated and moist state till of proper consistency for making into balls or bricks for burning. I then take the bricks or balls and dry them by artificial heat, or in the air under sheds (I prefer the former) until little or no moisture remains in them. I then calcine them in a reverberatory furnace or suitable kiln to about the verge of vitrification, or until little or no free lime remains, and then, after drawing them from the furnace or kiln, and cooling somewhat, I grind them to a fine powder for use as cement or mortar for building purposes, &c., and for making artificial stone.

Artificial stone for buildings, side-walks, and other like purposes is readily made by the use of this cement alone, when mixed with water. Silicious or any earthy matter, broken stone, gravel, &c., and any suitable coloring matter may be added, if desired.

While I prefer, as a matter of economy, to use clay containing silica, alumina, oxide of iron, manganese, or corundum, it will be understood that these substances may be used separately or together, apart from clay, in the manufacture of hydraulic cement.

Having described my invention, I claim—

1. Clays containing silica, alumina, oxide of iron, manganese, or corundum, or clays having these substances added in proper proportions, in combination with the limes herein set forth, for the purpose of manufacturing artificial hydraulic cement.

2. The refuse limes herein set forth, *i. e.*, from the manufacture or purification of gas, and from the manufacture of lye, for the purpose herein described.

3. Treating the materials herein set forth in the manner herein described, in the manufacture of hydraulic cement.

WILLIAM B. TUCKER.

Witnesses:
  C. H. SLICER,
  W. H. BAYZAUD.